United States Patent
Fujimura et al.

(10) Patent No.: US 10,883,945 B2
(45) Date of Patent: Jan. 5, 2021

(54) SIMULTANEOUS MULTI-ELEMENTS ANALYSIS TYPE X-RAY FLUORESCENCE SPECTROMETER, AND SIMULTANEOUS MULTI-ELEMENTS X-RAY FLUORESCENCE ANALYZING METHOD

(71) Applicant: RIGAKU CORPORATION, Akishima (JP)

(72) Inventors: Seiji Fujimura, Takatsuki (JP); Yu Aoki, Takatsuki (JP)

(73) Assignee: Rigaku Corporation, Akishima (JP)

( * ) Notice: Subject to any disclaimer, the term of this patent is extended or adjusted under 35 U.S.C. 154(b) by 350 days.

(21) Appl. No.: 16/076,112

(22) PCT Filed: Feb. 16, 2017

(86) PCT No.: PCT/JP2017/005678
§ 371 (c)(1),
(2) Date: Aug. 7, 2018

(87) PCT Pub. No.: WO2017/154505
PCT Pub. Date: Sep. 14, 2017

(65) Prior Publication Data
US 2020/0378908 A1 Dec. 3, 2020

(30) Foreign Application Priority Data

Mar. 8, 2016 (JP) .................. 2016-044179

(51) Int. Cl.
*G01N 23/223* (2006.01)
*G01N 23/207* (2018.01)

(52) U.S. Cl.
CPC ......... *G01N 23/223* (2013.01); *G01N 23/207* (2013.01); *G01N 2223/076* (2013.01); *G01N 2223/6116* (2013.01)

(58) Field of Classification Search
CPC ............... G01N 23/207; G01N 23/223; G01N 2223/076; G01N 2223/6116
See application file for complete search history.

(56) References Cited

U.S. PATENT DOCUMENTS 5,497,407 A 3/1996 Komatsu et al.
6,597,439 B1 7/2003 Hakamata
(Continued)

FOREIGN PATENT DOCUMENTS

CN 104412062 A 3/2015
EP 0766083 A2 4/1997
(Continued)

OTHER PUBLICATIONS

International Search Report for PCT/JP2017/005678 dated May 9, 2017 [PCT/ISA/210].
(Continued)

*Primary Examiner* — Mark R Gaworecki
(74) *Attorney, Agent, or Firm* — Sughrue Mion, PLLC

(57) ABSTRACT

A simultaneous multi-elements analysis type X-ray fluorescence spectrometer according to the present invention includes: a sample table (2) on which a sample (1) is placed and a conveyance arm (22) for the sample (1). The sample table (2) has a cutout (2e) formed therein, through which the conveyance arm (22) is allowed to pass in a vertical direction. Regarding respective measurement points (Pn) on a blank wafer (1b), a background correction unit (21) previously stores, as background intensities at the measurement points (Pn), intensities obtained by subtracting a measured intensity at a reference measurement point (P0) located above the cutout (2e) from each of measured intensities at the measurement points (Pn), and regarding respective measurement points (Pn) on an analytical sample (1a), the background correction unit (21) subtracts the background intensities at the measurement points (Pn) from measured (Continued)

intensities at the measurement points (Pn), thereby correcting background.

2 Claims, 3 Drawing Sheets

(56) References Cited

U.S. PATENT DOCUMENTS

| | | | |
|---|---|---|---|
| 7,604,406 | B2 | 10/2009 | Tsuji et al. |
| 7,720,192 | B2 | 5/2010 | Hegeman et al. |
| 9,448,191 | B2 | 9/2016 | Utaka et al. |
| 2008/0310587 | A1 | 12/2008 | Hegeman et al. |
| 2009/0147912 | A1 | 6/2009 | Tsuji et al. |
| 2009/0278044 | A1 | 11/2009 | Vaez-Iravani et al. |
| 2013/0101085 | A1* | 4/2013 | Kita ............... G01N 23/223 378/44 |
| 2013/0170613 | A1 | 7/2013 | Utaka et al. |
| 2015/0219450 | A1 | 8/2015 | Hohshi et al. |

FOREIGN PATENT DOCUMENTS

| | | |
|---|---|---|
| JP | 2-99342 U1 | 8/1990 |
| JP | 05188019 A | 7/1993 |
| JP | 6-174663 A | 6/1994 |
| JP | 11-248653 A | 9/1999 |
| JP | 2000-9665 A | 1/2000 |
| JP | 2000-74859 A | 3/2000 |
| JP | 2001-91481 A | 4/2001 |
| JP | 2006-258633 A | 9/2006 |
| JP | 2007093593 A | 4/2007 |
| JP | 2007-155651 A | 6/2007 |
| JP | 2008256698 A | 10/2008 |
| JP | 2010122198 A | 6/2010 |
| JP | 2013137273 A | 7/2013 |

OTHER PUBLICATIONS

McWilliams, "Standard Operating Procedure for the X-Ray Fluorescence Analysis of PM2.5 Deposits on Teflon Filters", Jan. 20, 2004, Retrieved from the Internet: <URL: https://www3.epa.gov/ttnamti1/archive/files/ambient/pm25/spec/xrfsop.pdf>, pp. 1-16 (total 16 pages).
Quinn, "A General Method of Blank Subtraction for Quantitative X-Ray Fluorescence Intensity Measurements", Advances in X-Ray Analysis, Jan. 1, 1980, vol. 24, pp. 401-406 (total 6 pages).
Communication dated Nov. 5, 2019 from European Patent Office in counterpart EP Application No. 17762848.4.
International Preliminary Report on Patentability dated Sep. 20, 2018 in International Application No. PCT/JP2017/005678.
Communication dated Oct. 29, 2018 issued by the Korean Intellectual Property Office in counterpart application No. 10-2018-7023570.
Communication dated Feb. 26, 2019 from Japanese Patent Office in counterpart application No. 2016-044179.
Communication dated Jan. 31, 2019, issued by the Korean Intellectual Property Office in corresponding Korean Application No. 10-2018-7023570.
Communication dated Mar. 14, 2019, from the State Intellectual Property Office of People's Republic of China in counterpart Application No. 201780016018.2.

* cited by examiner

SIMULTANEOUS MULTI-ELEMENTS ANALYSIS TYPE X-RAY FLUORESCENCE SPECTROMETER, AND SIMULTANEOUS MULTI-ELEMENTS X-RAY FLUORESCENCE ANALYZING METHOD

CROSS REFERENCE TO THE RELATED APPLICATION

This application is a National Stage of International Application No. PCT/JP2017/005678, filed on Feb. 16, 2017, which is based on and claims Convention priority to Japanese patent application No. 2016-044179, filed Mar. 8, 2016, the entire disclosure of which is herein incorporated by reference as a part of this application.

BACKGROUND OF THE INVENTION

Field of the Invention

The present invention relates to a simultaneous multi-elements analysis type X-ray fluorescence spectrometer and a simultaneous multi-elements X-ray fluorescence analyzing method, which are used for correcting background of a sample that is a semiconductor wafer.

Description of Related Art

To date, there have been proposed various types of X-ray fluorescence spectrometers according to analysis purposes. For example, Patent Document 1 discloses a simultaneous multi-elements analysis type X-ray fluorescence spectrometer which includes an X-ray source configured to irradiate a sample with primary X-rays, and includes, for each of wavelengths to be measured, a fixed goniometer having a spectroscopic device and a detector and configured to measure an intensity of fluorescent X-rays generated from the sample. Meanwhile, there has been proposed an X-ray fluorescence spectrometer including a sample table in which a substantially rectangular cutout is formed to allow a robotic hand (conveyance arm) conveying a semiconductor wafer as a sample to vertically move through the cutout (Patent Document 2).

In a sequential X-ray fluorescence spectrometer in which a spectroscopic device and a detector are interlocked with each other by means of a goniometer, background intensities are measured at points before and after the wavelength of fluorescent X-rays to be measured to estimate a background intensity at the wavelength of the fluorescent X-rays, and the estimated background intensity is subtracted from a measured intensity of the fluorescent X-rays, whereby background can be corrected. However, in the simultaneous multi-elements analysis type X-ray fluorescence spectrometer as disclosed in Patent Document 1, if other fixed goniometers are added in order to measure background intensities, the structure of the spectrometer becomes complicated, resulting in an increase in cost. Therefore, in the simultaneous multi-elements analysis type X-ray fluorescence spectrometer, it is desired to correct background without any additional fixed goniometers for background.

In recent years, with an increase in size of a semiconductor wafer, the thickness of the semiconductor wafer is reduced, and the thickness of a thin film formed on the semiconductor wafer is also reduced (e.g., a few nanometers). When a semiconductor wafer having such an ultrathin film formed thereon is subjected to measurement using an X-ray fluorescence spectrometer, the intensity of fluorescent X-rays generated from the ultrathin film is weak. In order to obtain a sufficiently-high measured intensity, the intensity of the fluorescent X-rays needs to be measured while being integrated for a long time. However, when the intensity of the fluorescent X-rays is measured while being integrated for a long time, the measured intensity of background also increases, and highly accurate analysis cannot be achieved unless the increased background is corrected.

Regarding the background correction as described above, when a semiconductor wafer having an ultrathin film formed thereon is subjected to measurement using the simultaneous multi-elements analysis type X-ray fluorescence spectrometer having the sample table in which the cutout is formed, on the sample table, the background intensity at a measurement point, of a sample, located above a portion other than the cutout is larger than the background intensity at a measurement point, of the sample, located above the cutout. This result reveals that highly-accurate analysis cannot be achieved unless the background having different intensities depending on the positions of the measurement points is accurately corrected.

RELATED DOCUMENT

Patent Document

[Patent Document 1] JP Laid-open Patent Publication No. 2007-155651

[Patent Document 2] JP Laid-open Patent Publication No. 2000-74859

SUMMARY OF THE INVENTION

The present invention is made in view of the aforementioned problems of the conventional arts, and an object of the present invention is to provide a simultaneous multi-elements analysis type X-ray fluorescence spectrometer and a simultaneous multi-elements X-ray fluorescence analyzing method, which are able to analyze a semiconductor wafer with high accuracy by accurately correcting background, without any additional fixed goniometers for background, even when a sample table has a cutout formed therein.

In order to attain the aforementioned object, a simultaneous multi-elements analysis type X-ray fluorescence spectrometer according to the present invention includes: a sample table on which a sample that is a semiconductor wafer is placed; a conveyance arm configured to place and remove the sample on and from the sample table; a stage configured to cause the sample table to move; an X-ray source configured to irradiate the sample with primary X-rays; a fixed goniometer provided for each of wavelengths to be measured, the fixed goniometer having a spectroscopic device and a detector, and being configured to measure an intensity of fluorescent X-rays generated from the sample; and a control unit configured to control the conveyance arm, the stage, the X-ray source, and the fixed goniometer, and to measure intensities, of the fluorescent X-rays, at a plurality of measurement points on a surface of the sample, thereby to obtain distribution of the measured intensities on the sample. The sample table has a cutout formed therein, through which the conveyance arm is allowed to pass in a vertical direction.

In the simultaneous multi-elements analysis type X-ray fluorescence spectrometer according to the present invention, the control unit further includes a background correction unit. The background correction unit is configured to: regarding respective measurement points on a blank wafer, previously store, as background intensities at the measurement points, intensities obtained by subtracting a measured intensity at a reference measurement point located above the cutout from each of measured intensities at the measurement points; and regarding respective measurement points on an analytical sample, subtract the background intensities at the measurement points from measured intensities at the measurement points, thereby to correct background.

According to the simultaneous multi-elements analysis type X-ray fluorescence spectrometer of the present invention, regarding the respective measurement points on the blank wafer, the intensities obtained by subtracting the measured intensity at the reference measurement point located above the cutout from each of the measured intensities at the measurement points are stored as background intensities at the measurement points, and regarding the respective measurement points on the analytical sample, the background intensities at the measurement points are subtracted from the measured intensities at the measurement points, thereby to correct background. Therefore, even when the sample table has the cutout formed therein, the semiconductor wafer can be analyzed with high accuracy by accurately correcting background, without any additional fixed goniometers for background.

An X-ray fluorescence analyzing method according to the present invention uses a simultaneous multi-elements analysis type X-ray fluorescence spectrometer including: a sample table on which a sample that is a semiconductor wafer is placed; a conveyance arm configured to place and remove the sample on and from the sample table; a stage configured to cause the sample table to move; an X-ray source configured to irradiate the sample with primary X-rays; a fixed goniometer provided for each of wavelengths to be measured, the fixed goniometer having a spectroscopic device and a detector, and being configured to measure an intensity of fluorescent X-rays generated from the sample; a control unit configured to control the conveyance arm, the stage, the X-ray source, and the fixed goniometer, and to measure intensities, of the fluorescent X-rays, at a plurality of measurement points on a surface of the sample, thereby to obtain distribution of the measured intensities on the sample; and the sample table having a cutout formed therein, through which the conveyance arm is allowed to pass in a vertical direction. Regarding respective measurement points on a blank wafer, intensities obtained by subtracting a measured intensity at a reference measurement point located above the cutout from each of measured intensities at the measurement points are obtained as background intensities at the measurement points, and regarding respective measurement points on an analytical sample, the background intensities at the measurement points are subtracted from measured intensities at the measurement points, thereby to correct background.

According to the X-ray fluorescence analyzing method of the present invention, regarding the respective measurement points on the blank wafer, the intensities obtained by subtracting the measured intensity at the reference measurement point located above the cutout from each of the measured intensities at the measurement points are regarded as background intensities at the measurement points, and regarding the respective measurement points on the analytical sample, the background intensities at the measurement points are subtracted from the measured intensities at the measurement points, thereby to correct background. Therefore, even when the sample table of the used simultaneous multi-elements analysis type X-ray fluorescence spectrometer has the cutout formed therein, the semiconductor wafer can be analyzed with high accuracy by accurately correcting background, without any additional fixed goniometers for background.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 1:
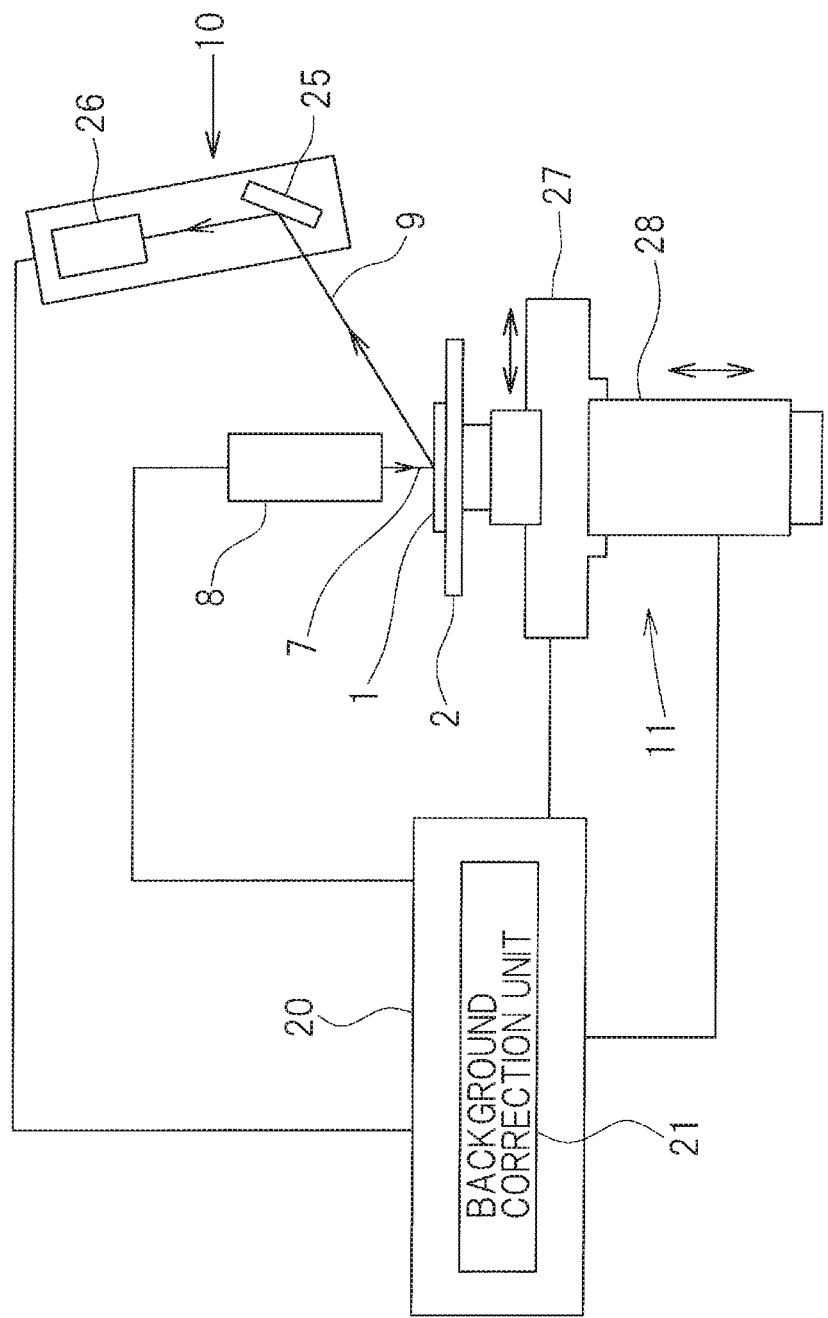
FIG. 1 is a schematic diagram showing a simultaneous multi-elements analysis type X-ray fluorescence spectrometer according to a first embodiment of the present invention.

Hereinafter, a simultaneous multi-elements analysis type X-ray fluorescence spectrometer according to a first embodiment of the present invention will be described in accordance with the drawings. As shown in FIG. 1, the simultaneous multi-elements analysis type X-ray fluorescence spectrometer includes: a sample table 2 on which a sample 1 that is a semiconductor wafer is placed; a conveyance arm 22 (FIG. 2) which places and removes the sample 1 on and from the sample table 2; a stage 11 which causes the sample table 2 to move; and an X-ray source 8 which irradiates the sample 1 with primary X-rays 7. The spectrometer further includes, for each of wavelengths to be measured, a fixed goniometer 10 which includes a spectroscopic device 25 and a detector 26 and measures an intensity of fluorescent X-rays 9 generated from the sample 1. The spectrometer further includes a control unit 20 which controls the conveyance arm 22, the stage 11, the X-ray source 8, and the fixed goniometer 10, and measures the intensities, of the fluorescent X-rays 9, at a plurality of measurement points Pn (FIG. 3) on a surface of the sample, thereby to obtain distribution of the measured intensities on the sample 1. The sample table 2 has a cutout 2e (FIG. 2) formed therein, through which the conveyance arm 22 is allowed to pass in the vertical direction.

In the simultaneous multi-elements analysis type X-ray fluorescence spectrometer according to the first embodiment, the control unit 20 includes a background correction unit 21. The background correction unit 21, regarding the respective measurement points Pn on a blank wafer 1b to which nothing is adhered, previously stores, as background intensities at the measurement points Pn, intensities obtained by subtracting a measured intensity at a reference measurement point P0 located above the cutout 2e from each of measured intensities at the measurement points Pn, and the background correction unit 21, regarding the respective measurement points Pn on an analytical sample 1a, subtracts the background intensities at the measurement points Pn from measured intensities at the measurement points Pn, thereby to correct background. The measurement points Pn include the reference measurement point P0.

Figure 2:
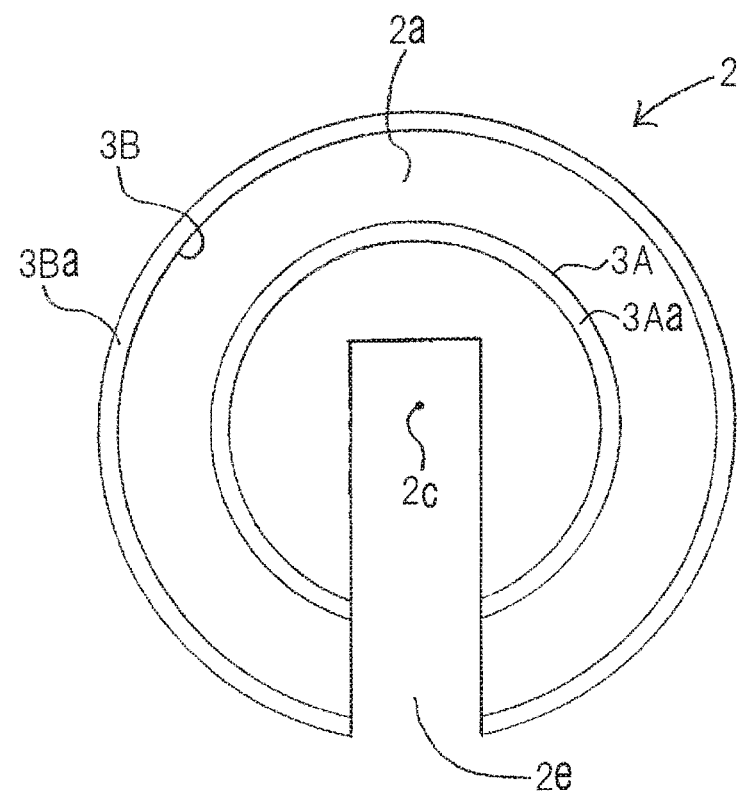
FIG. 2 is a plan view showing a sample table provided in the spectrometer.
Figure 2:
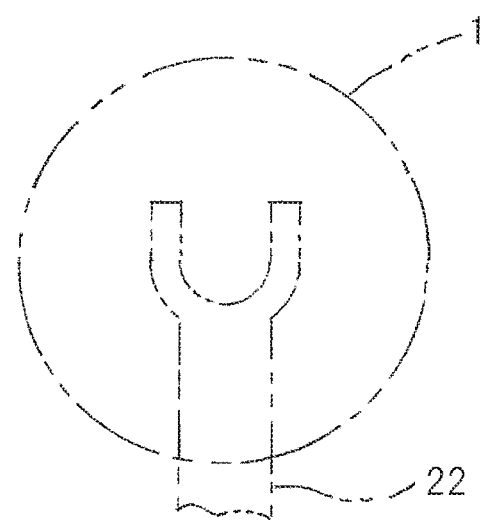
Figure 3:
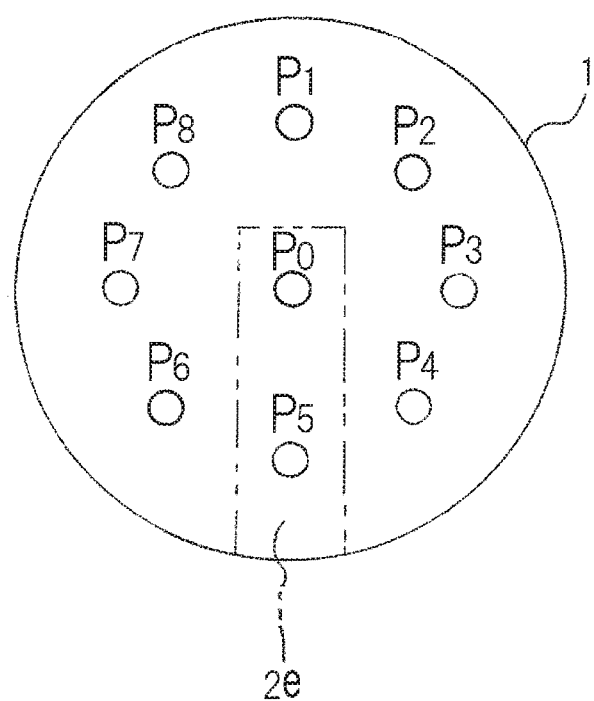
FIG. 3 is a diagram showing measurement points on a sample.

As shown in FIG. 2, the sample table 2 is a disk-shaped table made of, for example, ceramic, on which a disk-shaped sample 1 having a predetermined diameter, for example, a semiconductor wafer 1 having a diameter of 300 mm which is obtained by forming a 2 nm thick CoFeB alloy film on a surface of a silicon wafer, is placed. The sample table 2 has projecting portions 3A and 3B in part of an upper surface 2a thereof, and upper surfaces 3Aa and 3Ba of the projecting portions 3A and 3B are flush with each other. The sample 1 is placed on the sample table 2 such that part of a non-analysis surface (lower surface) of the sample 1 is in contact with the upper surfaces 3Aa and 3Ba of the projecting portions 3A and 3B. The sample table 2 has a substantially rectangular cutout 2e formed therein, through which the conveyance arm 22 is allowed to pass in the vertical direction. This cutout 2e is formed beyond a center point 2c of the disk-shaped sample table 2.

The stage 11 includes: an XY table 27 which causes the sample table 2 to move along a horizontal plane; and a height adjuster 28 which causes the height of the XY table 27 to vary. The XY table 27 and the height adjuster 28 are controlled by the control unit 20. Although only one fixed goniometer 10 is shown in FIG. 1, a fixed goniometer 10 is provided for each of wavelengths to be measured.

Next, the operation of the simultaneous multi-elements analysis type X-ray fluorescence spectrometer according to the first embodiment will be described. When, in the control unit 20, measurement points P0 to P8 (FIG. 3) including the reference measurement point P0 are set for the sample 1, the conveyance arm 22, the stage 11, the X-ray source 8, and the fixed goniometer 10 are controlled by the control unit 20. Then, as shown in FIG. 1, the blank wafer 1b is placed on the sample table 2 by the conveyance arm 22, and the sample table 2 is moved by the stage 11, whereby the blank wafer 1b is subjected to measurement sequentially at the respective measurement points P0 to P8. Regarding the respective measurement points P0 to P8, intensities obtained by subtracting the measured intensity at the reference measurement point P0 from each of the measured intensities at the measurement points P0 to P8 are previously stored in the background correction unit 21, as background intensities at the measurement points P0 to P8. That is, the background intensity at the reference measurement point P0 is stored as 0 cps in the background correction unit 21. The reference measurement point P0, on the sample 1, is located above the cutout 2e, and corresponds to, for example, the center point 2c of the sample table 2.

When the background correction unit 21 has stored the background intensities at the measurement points P0 to P8 therein, the blank wafer 1b is removed from the sample table 2 by the conveyance arm 22. Then, the analytical sample 1a is placed on the sample table 2 by the conveyance arm 22, and is subjected to measurement sequentially at the respective measurement points P0 to P8 in a similar manner to that for the blank wafer 1b. Regarding the respective measurement points P0 to P8 of the analytical sample 1a, the background correction unit 21 subtracts the stored background intensities at the measurement points P0 to P8 from the measured intensities at the measurement points P0 to P8, thereby correcting background.

According to the simultaneous multi-elements analysis type X-ray fluorescence spectrometer of the first embodiment, regarding the respective measurement points P0 to P8 on the blank wafer 1b, the intensities obtained by subtracting the measured intensity at the reference measurement point P0 located above the cutout 2e from each of the measured intensities at the measurement points P0 to P8 are stored as background intensities at the measurement points P0 to P8, and regarding the respective measurement points P0 to P8 on the analytical sample 1a, the background intensities at the measurement points P0 to P8 are subtracted from the measured intensities at the measurement points P0 to P8, thereby to correct background. Therefore, even when the sample table 2 has the cutout 2e formed therein, the semiconductor wafer can be analyzed with high accuracy by accurately correcting background, without any additional fixed goniometers for background.

Next, a simultaneous multi-elements X-ray fluorescence analyzing method according to a second embodiment of the present invention will be described. A simultaneous multi-elements analysis type X-ray fluorescence spectrometer used in this analyzing method is identical in structure to the simultaneous multi-elements analysis type X-ray fluorescence spectrometer of the first embodiment except that the control unit 20 does not include the background correction unit 21. In the control unit 20 of the simultaneous multi-elements analysis type X-ray fluorescence spectrometer, when respective measurement points P0 to P8 (FIG. 3) are set for the sample 1, the conveyance arm 22, the stage 11, the X-ray source 8, and the fixed goniometer 10 are controlled by the control unit 20. Then, as shown in FIG. 1, the blank wafer 1b is placed on the sample table 2 by the conveyance arm 22, and the sample table 2 is caused to move by the stage 11, whereby the blank wafer 1b is subjected to measurement sequentially at the respective measurement points P0 to P8. Then, regarding the measurement points P0 to P8, the intensities obtained by subtracting the measured intensity at the reference measurement point P0 from each of the measured intensities at the measurement points P0 to P8 are obtained as background intensities at the measurement points P0 to P8. That is, the background intensity at the reference measurement point P0 is 0 cps.

Next, the blank wafer 1b is removed from the sample table 2 by the conveyance arm 22, and thereafter, the analytical sample 1a is placed on the sample table 2 by the conveyance arm 22 and is subjected to measurement sequentially at the respective measurement points P0 to P8, in a similar manner to that for the blank wafer 1b. Then, regarding the measurement points P0 to P8 on the analytical sample 1a, the background intensities obtained at the measurement points P0 to P8 on the blank wafer 1b are subtracted from the measured intensities at the measurement points P0 to P8, thereby correcting the background.

According to the simultaneous multi-elements X-ray fluorescence analyzing method of the second embodiment, regarding the respective measurement points P0 to P8 on the blank wafer 1b, the intensities obtained by subtracting the measured intensity at the reference measurement point P0 located above the cutout 2e from each of the measured intensities at the measurement points P0 to P8 are regarded as the background intensities at the measurement points P0 to P8, and regarding the respective measurement points P0 to P8 on the analytical sample 1a, the background intensities at the measurement points P0 to P8 are subtracted from the measured intensities at the measurement points P0 to P8, thereby correcting the background. Therefore, even when the sample table 2 of the used simultaneous multi-elements analysis type X-ray fluorescence spectrometer has the cutout 2e formed therein, the semiconductor wafer can be analyzed with high accuracy by accurately correcting background, without any additional fixed goniometers for background.

Figure 4:
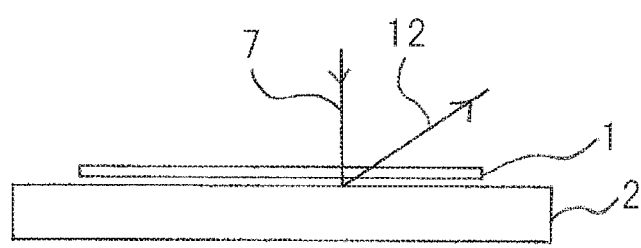
FIG. 4 is a conceptual diagram showing generation of scattered X-rays at a non-cutout portion of a sample table.

The reason why the background intensity at the measurement point P1, of the sample 1, located above a non-cutout portion (portion other than the cutout) is greater than the background intensity at the measurement point P5, of the sample 1, located above the cutout 2e is considered that, as shown in FIG. 4, the primary X-rays 7 having passed through the sample 1 at the non-cutout portion are applied to the sample table 2, and scattered X-rays 12 are generated from the sample table 2, and then the scattered X-rays 12 pass through the sample 1 and are detected as background by the detector. Meanwhile, it is considered that the primary X-rays 7, which have been applied to the measurement point P5, of the sample 1, located above the cutout and have passed through the sample 1, pass through the cutout 2e and are scattered or absorbed by the structure of the spectrometer so as not to be detected as background. As described above, the sample table 2 includes the projecting portions 3A and 3B at the upper surface 2a thereof, and the upper surfaces 3Aa and 3Ba of the projecting portions 3A and 3B are in contact with the lower surface of the sample 1. The projecting portions 3A and 3B each have a width of 1 mm and a height of 500 μm. Although a space is formed which is surrounded by the lower surface of the sample 1, the side surfaces of the projecting portions 3A and 3B, and the upper surface 2a of the sample table 2, since this space would not exert an influence that may cause a significant difference in the measured values, a portion of the sample table 2 beneath this space is also included in the non-cutout portion described above.

An example of measurement to which the present invention is applied will be described below. The sample 1 subjected to the measurement is a semiconductor wafer 1 having a diameter of 300 mm and a thickness of 775 μm, which is obtained by forming a 2 nm thick (design value) CoFeB alloy film on a surface of a silicon wafer. The sample 1 was placed on the sample table 2 in a direction in which the detector 26 is not affected by diffraction lines generated from the sample 1. The measurement point P5 (FIG. 3) located above the cutout 2e and the measurement point P8 (FIG. 3) located above the non-cutout portion were irradiated with primary X-rays 7 emitted from the X-ray source 8 as a beam having a diameter of 40 mm, and the intensities of Co-Kα line, Fe-Kα line, and B-Kα line, which are fluorescent X-rays generated from the sample 1, were measured under a vacuum atmosphere.

Regarding the measurement point P5 and the measurement point P8, the background intensities of the Co-Kα line and the Fe-Kα line, which had previously been stored, were subtracted from the measured intensities of the Co-Kα line and the Fe-Kα line, respectively, thereby correcting background. The B-Kα line as a measurement line was not subjected to background correction because, among the primary X-rays 7, continuous X-rays of the same wavelength as the B-Kα line hardly transmit the semiconductor wafer 1 because of the long wavelength thereof. On the basis of the measured intensities, the thickness of the alloy film of the sample 1 was calculated by using scattering FP procedure. As a result of the calculation, the thickness of the alloy film was 1.996 nm at the measurement point P5 located above the cutout 2e, and 1.993 nm at the measurement point P8 located above the non-cutout portion. When the thickness of the alloy film was similarly calculated without performing background correction, a significant difference from the case where background correction was performed was not observed at the measurement point P5 located above the cutout 2e, whereas the thickness of the alloy film was 2.016 nm, i.e., was 0.023 nm thicker than in the case where background correction was performed, at the measurement point P8 located above the non-cutout portion. This result reveals that the thickness of the alloy film includes an error of about 1% if the background correction according to the present invention is not performed.

In the simultaneous multi-elements analysis type X-ray fluorescence spectrometer according to the first embodiment and the simultaneous multi-elements X-ray fluorescence analyzing method according to the second embodiment, the respective measurement points P0 to P8 are set on the sample 1, but the respective measurement points Pn may be previously stored in the control unit 20.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

1 . . . sample
1a . . . analytical sample
1b . . . blank wafer
2 . . . sample table
2e . . . cutout
7 . . . primary X-rays
8 . . . X-ray source
9 . . . fluorescent X-rays
10 . . . fixed goniometer
11 . . . stage
20 . . . control unit
21 . . . background correction unit
22 . . . conveyance arm
25 . . . spectroscopic device
26 . . . detector
P0 . . . reference measurement point
Pn . . . measurement point

What is claimed is:

1. A simultaneous multi-elements analysis type X-ray fluorescence spectrometer comprising:
　a sample table on which a sample that is a semiconductor wafer is placed;
　a conveyance arm configured to place and remove the sample on and from the sample table;
　a stage configured to cause the sample table to move;
　an X-ray source configured to irradiate the sample with primary X-rays;
　a fixed goniometer provided for each of wavelengths to be measured, the fixed goniometer having a spectroscopic device and a detector, and being configured to measure an intensity of fluorescent X-rays generated from the sample; and
　a control unit configured to control the conveyance arm, the stage, the X-ray source, and the fixed goniometer, and to measure intensities, of the fluorescent X-rays, at a plurality of measurement points on a surface of the sample, thereby to obtain distribution of the measured intensities on the sample, wherein the sample table has a cutout formed therein, through which the conveyance arm is allowed to pass in a vertical direction, the control unit includes a background correction unit, and the background correction unit is configured to regarding respective measurement points on a blank wafer, previously store, as background intensities at the measurement points, intensities obtained by subtracting a measured intensity at a reference measurement point located above the cutout from each of measured intensities at the measurement points, and regarding respective measurement points on an analytical sample, subtract the background intensities at the measurement points from measured intensities at the measurement points, thereby to correct background.

2. An X-ray fluorescence analyzing method using a simultaneous multi-elements analysis type X-ray fluorescence spectrometer including:

a sample table on which a sample that is a semiconductor wafer is placed;

a conveyance arm configured to place and remove the sample on and from the sample table;

a stage configured to cause the sample table to move;

an X-ray source configured to irradiate the sample with primary X-rays;

a fixed goniometer provided for each of wavelengths to be measured, the fixed goniometer having a spectroscopic device and a detector, and being configured to measure an intensity of fluorescent X-rays generated from the sample;

a control unit configured to control the conveyance arm, the stage, the X-ray source, and the fixed goniometer, and to measure intensities, of the fluorescent X-rays, at a plurality of measurement points on a surface of the sample, thereby to obtain distribution of the measured intensities on the sample; and the sample table having a cutout formed therein, through which the conveyance arm is allowed to pass in a vertical direction, the method comprising:

regarding respective measurement points on a blank wafer, obtaining, as background intensities at the measurement points, intensities obtained by subtracting a measured intensity at a reference measurement point located above the cutout from each of measured intensities at the measurement points; and regarding respective measurement points on an analytical sample, subtracting the background intensities at the measurement points from measured intensities at the measurement points, thereby to correct background.

* * * * *